(12) United States Patent
Hidrot et al.

(10) Patent No.: US 8,936,055 B2
(45) Date of Patent: Jan. 20, 2015

(54) TIRE TREAD WITH BLOCKS OF AT LEAST ONE INTERMEDIATE ROW HAVING INCISION AND BLIND LONGILINEAR CAVITY

(75) Inventors: Jean-Denis Hidrot, Chamalieres (FR); Benjamin Quantinet, Clermont-Ferrand (FR)

(73) Assignees: Michelin Recherche et Techniques S.A., Granges-Paccot (CH); Compagnie Generale des Etablissements Michelin, Clerment-Ferrand (FR)

( * ) Notice: Subject to any disclaimer, the term of this patent is extended or adjusted under 35 U.S.C. 154(b) by 1099 days.

(21) Appl. No.: 12/933,624
(22) PCT Filed: Mar. 20, 2009
(86) PCT No.: PCT/EP2009/053322
§ 371 (c)(1),
(2), (4) Date: Dec. 14, 2010
(87) PCT Pub. No.: WO2009/115606
PCT Pub. Date: Sep. 24, 2009

(65) Prior Publication Data
US 2011/0083777 A1    Apr. 14, 2011

(30) Foreign Application Priority Data
Mar. 20, 2008   (FR) ..................... 08 51796

(51) Int. Cl.
*B60C 11/117*   (2006.01)
*B60C 11/12*    (2006.01)

(52) U.S. Cl.
CPC ............ *B60C 11/12* (2013.01); *B60C 11/1218* (2013.04); *B60C 11/1281* (2013.04);
(Continued)

(58) Field of Classification Search
USPC ............ 152/209.17, 209.21, 209.23, 209.24, 152/DIG. 3
See application file for complete search history.

(56) References Cited

U.S. PATENT DOCUMENTS 5,127,455 A * 7/1992 Remick .................... 152/209.24
5,679,186 A   10/1997 Tagashira et al.
(Continued)

FOREIGN PATENT DOCUMENTS

EP   1 207 057        5/2002
JP   01-101204 A  *  4/1989
(Continued)

OTHER PUBLICATIONS

Machine translation for Japan 09-011712 (no date).*

*Primary Examiner* — Steven D Maki
(74) *Attorney, Agent, or Firm* — Cozen O'Connor

(57) ABSTRACT

Tire tread (1) comprising a plurality of blocks (6), each block (6) comprising a leading face (61), a trailing face (62) and a contact face (60), the leading face (61) making a mean angle αA greater than 0 degrees, the trailing edge (62) making a mean angle αF greater than 0 degrees, the angle αA of the leading face (61) being greater than the angle αF of the trailing face, each block (6) comprises an incision (7) extending into the thickness of the block, this incision (7) being delimited by opposing faces provided with blocking means (71) for blocking the relative movements of one of the said faces with respect to the other face in at least one direction, this incision (7) dividing the contact face (60) of the block into two parts with substantially equal surface areas, this tread being characterized in that the incision (7) is inclined by a mean angle β, measured with respect to the perpendicular to the contact face (60) in the same direction as the angle αA of the leading face and in that the volume of material contained between the leading face (61) and the incision (7) is less than the volume of material contained between the trailing face (62) and the same incision (7).

10 Claims, 3 Drawing Sheets

(52) U.S. Cl.
CPC ....... *B60C11/124* (2013.04); *B60C 2011/1209* (2013.04); *B60C 2011/1213* (2013.04); *B60C 2011/1254* (2013.04); *Y10S 152/03* (2013.01)
USPC ............ 152/209.17; 152/209.23; 152/209.24; 152/DIG. 3

(56) References Cited

U.S. PATENT DOCUMENTS 6,382,283 B1     5/2002    Caretta

2002/0100527 A1*   8/2002   Radulescu et al. ....... 152/209.24
2003/0029535 A1     2/2003   Neugebauer et al.

FOREIGN PATENT DOCUMENTS

| JP | 04-095510 | | 3/1992 |
| JP | 09-011712 A | * | 1/1997 |
| JP | 2001-063318 | | 3/2001 |
| WO | WO-99/48707 A1 | * | 9/1999 |

* cited by examiner

TIRE TREAD WITH BLOCKS OF AT LEAST ONE INTERMEDIATE ROW HAVING INCISION AND BLIND LONGILINEAR CAVITY

RELATED APPLICATIONS

This is a U.S. national stage of application No. PCT/EP2009/053322, filed on March 20, 2009.

This patent application claims the priority of French patent application no. 08/51796 filed Mar. 20, 2008, the disclosure content of which is hereby incorporated by reference.

FIELD OF THE INVENTION

The invention relates to the tread of a tire for a vehicle carrying heavy loads such as heavy goods vehicles, and more particularly to an arrangement that improves the evenness of wear of this tread.

BACKGROUND OF THE INVENTION

As is known, a heavy goods vehicle tire tread comprises grooves of circumferential or longitudinal overall orientation (overall orientation is to be understood here to mean that these grooves extend in the circumferential direction, but that they may be straight or zigzagged). It is common place to differentiate the design of the tread pattern according to the axle on which the tire is mounted. When used on a driven axle, the tread of a heavy goods vehicle tire is also provided with a plurality of grooves of transverse overall orientation (what is to be understood here by a transverse overall orientation is that the mean direction of these grooves may be parallel to the direction of the axis of rotation of the tire or make an angle other than zero with the said axis).

The circumferentially and transversely orientated grooves of such a tread delimit, at least in the middle part of the tread, at least one row known as "intermediate row" formed of a succession of elements in relief in the form of blocks of rubber compound, these blocks having mean heights equal to the depth of the grooves that delimit them.

Each block comprises a contact face intended to come into contact with the road surface during running, and lateral faces that divide up the said contact face to form edge corners. The edge corner that is first to come into contact with the road surface during running corresponds to the edge corner known as the "leading edge corner" and is formed by the intersection of the contact face with a lateral face known as the "leading face" of the block, and the edge corner that is last to leave contact is known as the "trailing edge corner" formed by the intersection of the contact face and a lateral face known as the "trailing face".

It is also known that under certain running conditions, the trailing edge corners of the blocks of the intermediate rows are subjected to more pronounced wear than the leading edge corners of the same blocks (leading to an uneven wear mechanism known as "saw-tooth" wear).

Solutions to this problem have been proposed in the past, and include the one described in patent U.S. Pat. No. 5,127,455. That document recommends inclining the leading face by a greater angle than the angle of inclination of the trailing face and limiting the angle between the leading face and the trailing face to at least 15 degrees and at most 25 degrees. In the aforegoing, the angle of a face is measured, in a plane of section perpendicular to the axis of rotation, with respect to a perpendicular to the running surface; the leading and trailing faces are inclined in such a way as to increase the width of the block with depth (and so the width of the groove between two blocks decreases as the tread wears away). The arrangement recommended in U.S. Pat. No. 5,127,455 gives this tread a single direction of running which is shown on the tread itself or on the tire provided with the tread using a visible means that indicates the said direction of running and thus ensures that the tire is mounted on the vehicle in the correct direction so that the full benefit of this differential inclination can be realized.

Furthermore, in order to achieve better grip on a wet road surface, each block may be provided with at least one incision (that is to say a cut the opposing faces of which are a mean distance of less than 1 mm apart. On each block provided with an incision, there are then created two additional edge corners that are useful for cutting into the film of water present on the road surface in rainy conditions.

However, it has been found that combining at least one incision with blocks as proposed in U.S. Pat. No. 5,127,455 could appreciably affect the wear rate of the blocks of the intermediate rows of a tread to the point that some of the supposed benefits could be lost by the creation of incisions in the blocks of these rows.

SUMMARY OF THE INVENTION

It is an object of the invention to propose a tread intended to form the radially outermost part of a tire intended to be mounted on a driven axle of a heavy goods vehicle and which makes it possible to achieve satisfactory performance in terms of grip while at the same time having the most even possible wear of the blocks of the intermediate rows (that is to say wear that is evenly distributed over the contact face of each block of the intermediate rows).

One aspect of the invention is directed to a tread for a tire intended to be fitted to a driven axle of a heavy goods vehicle (lorry, bus), this tread comprising at least two grooves of circumferential overall orientation and a plurality of grooves of transverse overall orientation delimiting at least one intermediate row of blocks and edge rows axially and transversely delimiting this tread.

Each block of the intermediate rows comprises lateral faces, a contact face intersecting the lateral faces to form edge corners, the edge corner designed to be first to come into contact with the road surface during running corresponding to the leading edge corner formed by the intersection of the contact face with a lateral face known as the leading face of the block, the edge corner last to leave contact being known as the trailing edge corner, the latter being formed by the intersection of the contact face and of a lateral face known as the trailing face.

On the blocks of the intermediate rows, the leading face makes, with a perpendicular to the contact face and passing through the leading edge corner, a mean angle $\alpha A$ which is greater than zero degrees, the trailing face making, with a perpendicular to the contact face and passing through the trailing edge corner, a mean angle $\alpha F$ which is greater than zero degrees, the angle $\alpha A$ of the leading face being greater than the angle $\alpha F$ of the trailing face, the leading and trailing faces of one and the same block being oriented in such a way as to diverge from one another from the running surface toward the interior of the tread.

Each block of at least one intermediate row comprises an incision extending into the thickness of the block over at least a depth equal to the depth of the transverse grooves that delimit the said block and from one lateral face of the block to the other, this incision being delimited by opposing faces provided with blocking means for blocking the relative movements of one of the said faces with respect to the other face in at least one direction, this incision dividing the contact face of the block, in the as-new state, into two surface parts with substantially equal surface areas. What should be meant by substantially equal surface areas is that these surface areas are equal or differ by no more than 1%.

This tread is characterized in that:
- the incision is inclined by a mean angle β, measured with respect to the perpendicular to the contact face in the same direction as the angle αA of the leading face, and in that
- the volume of material contained between the leading face and the incision is less than the volume of material contained between the trailing face and the same incision.

Thanks to this combination of means, the sweep of contact with the road surface during running surprisingly makes it possible to achieve a distribution of load between the front part of the blocks (the part of the block between the leading face and the incision) and the rear part (the part of the block between the incision and the trailing face) that encourages uniform and even distribution of wear across the entire contact face while at the same time having additional edge corners that are beneficial to grip.

For each incision of a relief element (block or channel), there is defined a mean plane on which the intersection with the contact face of the element defines a line. The mean plane of an incision is obtained by numerical processing which consists, having recorded the geometric position of the points on a wall of material that delimits this incision, in carrying out a linear regression in two directions, namely in the direction of the thickness of the tread and in a direction perpendicular to the direction of the thickness.

For preference, the angle of the incision β is greater than zero degrees and smaller than 30 degrees. The angle of the leading face αA is less than 45 degrees.

For preference, the difference between the volumes of material between the leading face and the incision and between the trailing face and the same incision is at least equal to 1% of the larger of the said volumes. For preference, the difference between the volumes of material between the leading face and the incision and between the trailing face and the same incision is at most equal to 15% of the larger of the said volumes.

In an advantageous variant, the tread according to the invention is provided with a plurality of blocks and over at least one of the volume parts of the blocks situated between the incision and the leading face or between the incision and the trailing face, is provided with at least one blind longilinear cavity (incision or well or hole), that is to say one that opens only onto the contact face of the blocks. Advantageously, these blind longilinear cavities have depths equal to or similar to the depth of the inclined incision and are themselves inclined by a mean angle other than zero degrees with respect to a perpendicular to the tread surface, this angle being in the same direction as the angle of the leading face of the blocks and at most equal to the angle that the said leading face makes.

Another aspect of the invention relates to a directional tire, that is to say one that has to be mounted on a heavy goods vehicle in a precise way in order to turn in a given direction when the vehicle is moving forwards. This tire is provided with a tread as described and also comprises a visible means (sign or marking) indicating the preferred direction of rotation of this tire. This sign or marking may adopt the form of at least one arrow molded into the sidewall part of the tire or on the lateral part of the tread itself.

BRIEF DESCRIPTION OF THE DRAWINGS

Further features and advantages of the invention will become apparent from the description given hereinafter with reference to the attached drawings which, by way of nonlimiting examples, show some embodiments of the subject matter of the invention.

DETAILED DESCRIPTION OF THE DRAWINGS

In all the figures of this application the same reference symbols are used to denote elements of identical structure in the various variants depicted.

Figure 1:
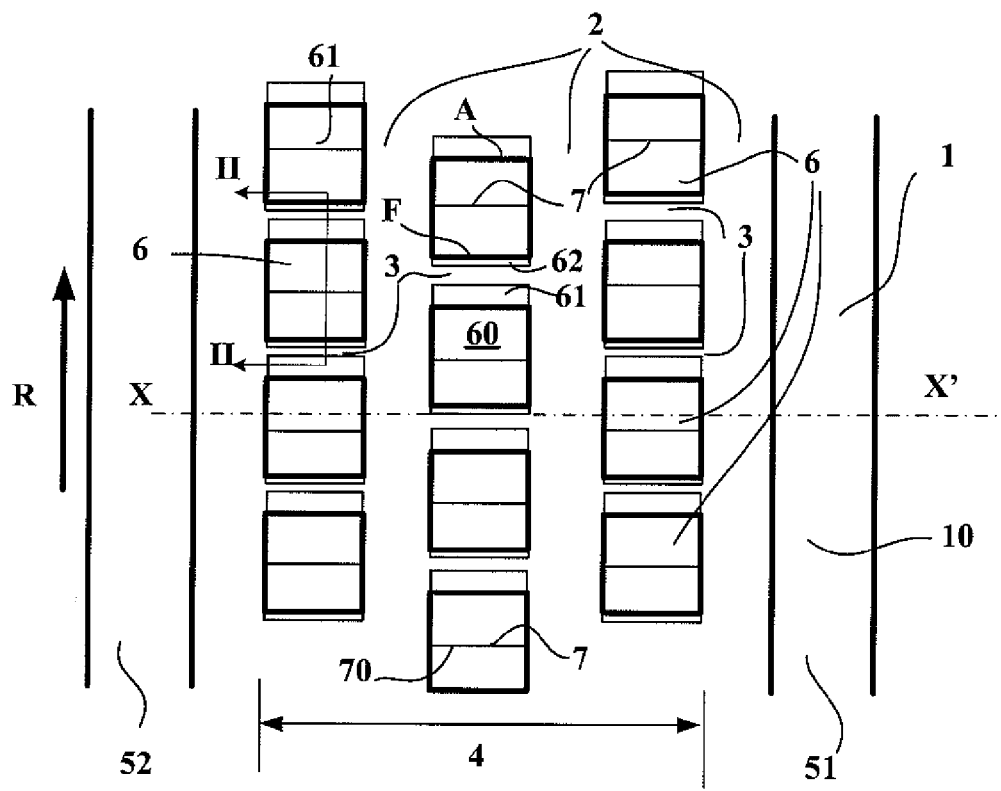
FIG. 1 shows a view of the tread surface of part of a tread according to the invention.

FIG. 1 shows a view of the tread surface of a tread 1 according to the invention. In this FIG. 1, the direction of rotation of the tire provided with such a tread that has to be observed in order to achieve the expected results is indicated; this direction of rotation is indicated in the figure by an arrow R. This tread is provided with four straight grooves 2 oriented circumferentially and dividing this tread into two edge parts 51 situated axially on the outside of the tread and an intermediate part 4. The intermediate part 4 comprises three rows of blocks 6 which are delimited by both the circumferential grooves and some transverse grooves 3 that run parallel to the axial direction (that is to say the direction of the axis of rotation identified in the figure as XX').

The edge parts 51 and 52 are circumferential ribs that have no incisions.

Each block 6 comprises lateral faces and a contact face 60, the latter being substantially parallel to the plane of FIG. 1. All of the contact faces of the relief elements of the tread together form the tread surface 10 of the tread 1 that is intended to come into contact with the road surface during running.

The contact face 60 of each block 6 is delimited by four edge corners. These edge corners are the intersections between the contact face 60 and each of the lateral faces. The edge corner of a block that is first to come into contact during running (in the direction of rotation dictated by the arrow R) is termed the leading edge corner A while the edge corner of the same block that is last to leave contact is known as the trailing edge corner F.

Figure 2:
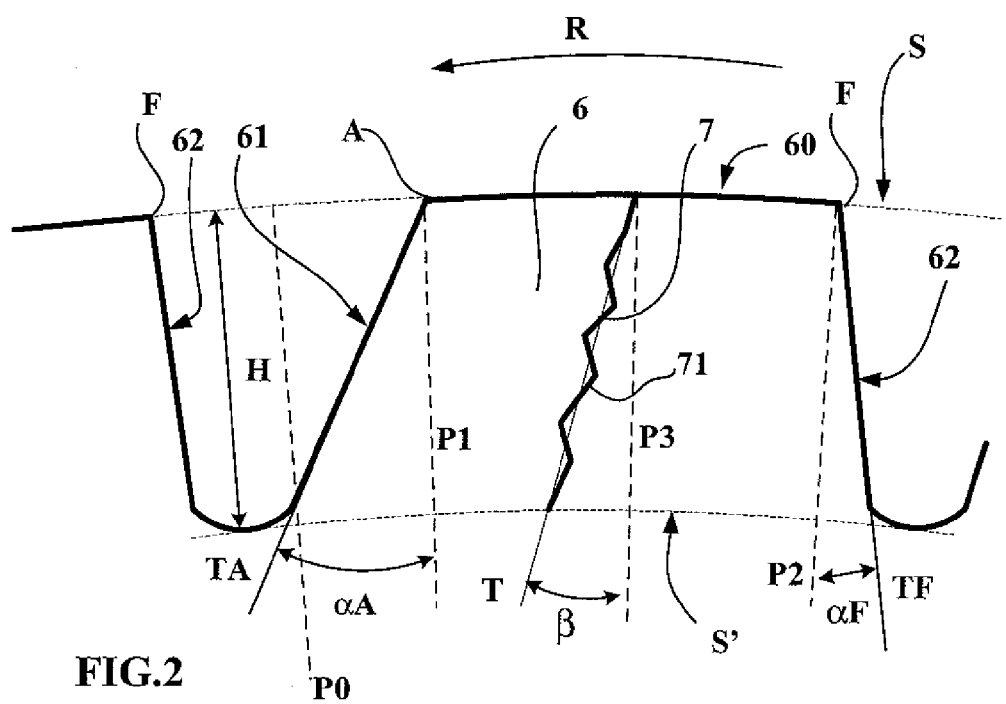
FIG. 2 shows a view in cross section of part of a row of blocks of the tread as shown in FIG. 1.

The lateral face that intersects the contact face 60 along the leading edge corner A corresponds to the leading face 61 of which the intersection with a plane perpendicular to the axis of rotation is shown in FIG. 2. The lateral face that intersects the contact face 60 along the trailing edge corner F corresponds to the trailing face 62 of which the intersection with a plane perpendicular to the axis of rotation is shown in FIG. 2.

In FIG. 2, which is a view in cross section in a plane perpendicular to the transverse axis XX' through a block of an intermediate row of the tread shown in FIG. 1 (the section is on II-II of FIG. 1), it is possible to make out the intersections of the leading 61 and trailing 62 faces that delimit grooves oriented substantially parallel to the axis XX'. The intersection of the contact face 60 of the block 6 ends with the intersection of the leading edge corner A and the intersection of the trailing edge corner F: the direction of rotation (shown by the arrow R) is given by the direction extending from the trailing edge corner to the leading edge corner.

The leading face 61 intersects the plane of FIG. 2 along a straight line TA; this straight line TA makes an angle αA with a perpendicular P1 to the contact face 60 passing through the point of intersection of the leading edge corner A with the plane of section of FIG. 2. The trailing face 62 intersects the plane of FIG. 2 along a straight line TF; this straight line TF makes an angle αF with a perpendicular P2 to the contact face 60 passing through the point of intersection of the trailing edge corner F with the plane of section of FIG. 2. The angles αA and αF are such that the mean width of a transverse groove decreases with depth (the leading and trailing faces have a tendency to converge to a perpendicular P0 that passes through the middle of the groove on the tread surface (the leading face converging more rapidly than the trailing face).

The angle αA in this case is equal to 12 degrees.

The angle αF in this case is 5 degrees.

The transverse grooves have a mean depth H.

Each block of the rows of blocks of the intermediate part 4 of the tread is provided with a single incision 7 that cuts across the contact face 60 along a mean line 70 visible in FIG. 1; this mean line 70 is, in this instance, straight on the tread in the as-new state and is parallel to the axis XX'. This mean line 70 cuts across the contact face in such a way as to divide this face into two parts of equal surface area.

Moreover, the incision 7 is inclined in the depth of the block by a mean angle β, measured with respect to the perpendicular to the tread surface, in the same direction as the angle αA of the leading face. What is meant here by in the same direction is that the points of the incision 7 furthest towards the inside of the tread have a tendency to diverge from the points of the trailing face.

The inclination of the incision 7 (in this example equal to 10 degrees) and that of the leading face (in this example equal to 12 degrees) are determined in such a way that they delimit between them a volume of material VA which is smaller than the volume VF that this same incision delimits with the trailing face of the same block. The difference (VF-VA) between these two volumes is here equal to 6.5% of the larger volume.

In this case, these volumes VF, VA are measured between the contact face (bounded by the curved surface S tangential to the contact face 60 of the block and a curved surface S' substantially parallel to the surface S and passing through the bottom of the incision 7.

Figure 3:
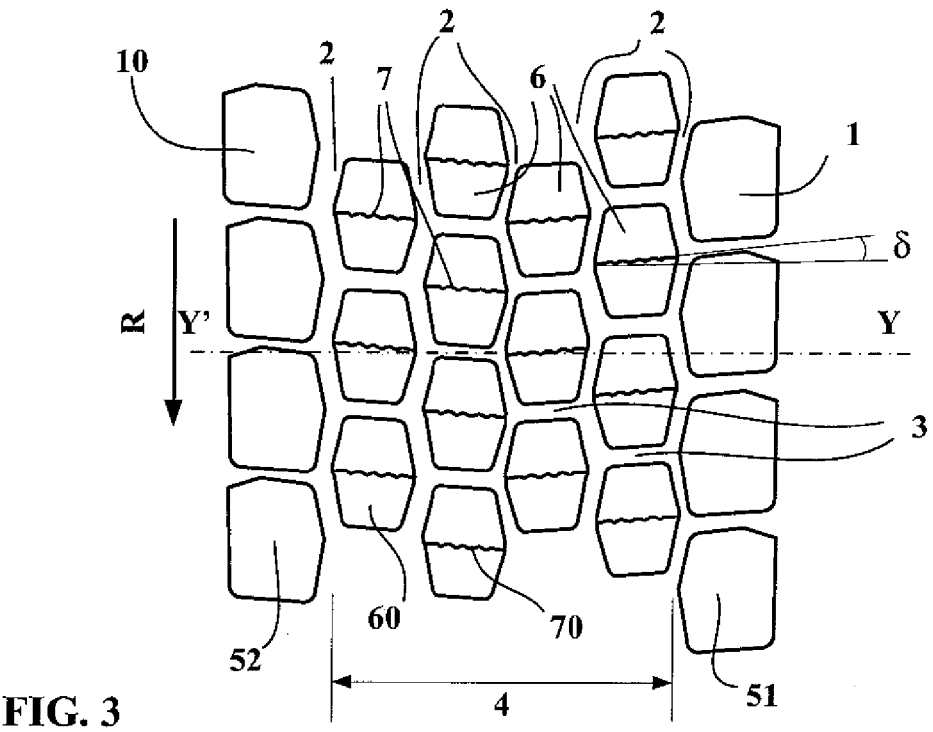
FIG. 3 shows another variant of tread according to the invention.
Figure 4:
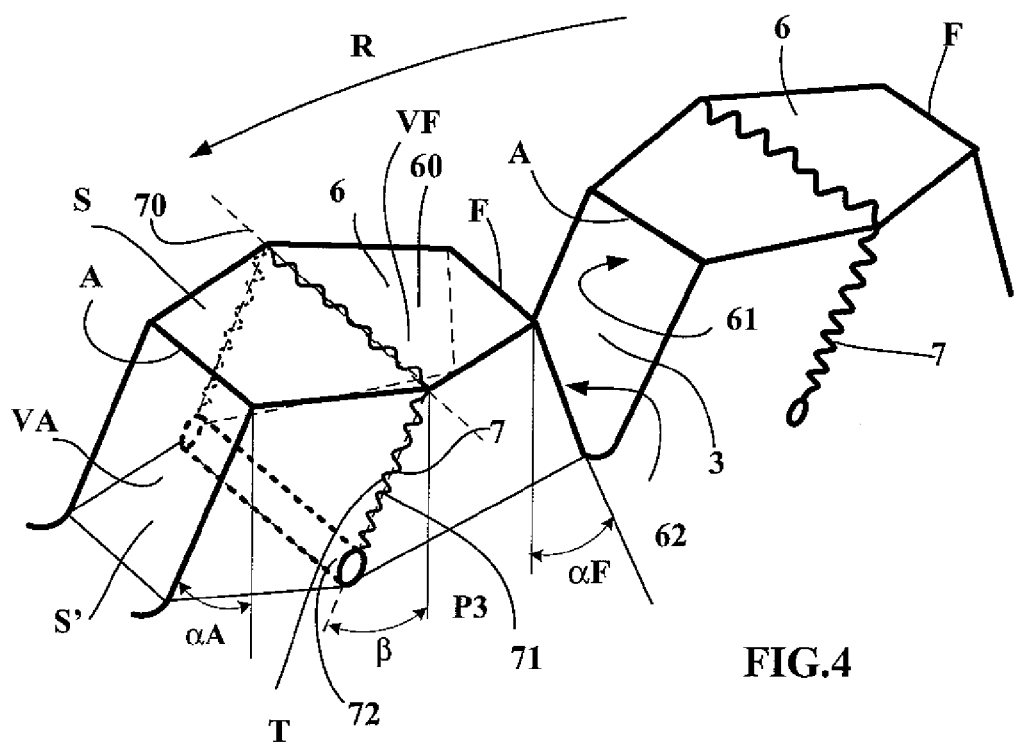
FIG. 4 shows a partial view of the variant shown in FIG. 3.

In the variant embodiment of a tread according to the invention and shown in FIGS. 3 and 4, the tread comprises an intermediate part formed of four rows of blocks of non-rectangular shape (six edge corners of different orientations delimit the contact face of each block). These blocks are delimited by non-rectilinear (in this instance zigzag) circumferential grooves and transverse grooves that are oblique, that is to say that make an angle δ other than zero degrees with the transverse direction (equal in this instance to 11 degrees). In other variants that have not been shown here, this angle δ may be chosen to be different from the angles of the leading and trailing edge corners.

FIG. 3 shows a view of the tread surface of a tread 1 that has a set direction of running and that may be indicated on the tread by a visible means (this direction is indicated in FIG. 3 by an arrow R).

This tread is provided with five rectilinear grooves 2 oriented circumferentially and dividing this tread into two edge parts 51, 52 situated axially on the outside of the tread and an intermediate part 4. The intermediate part 4 comprises four rows of blocks 6 delimited by both circumferential grooves and transverse grooves 3 that make an angle δ with the axial direction (embodied by the direction YY'), this angle δ here being equal to 11 degrees. The overall configuration of the design of the tread is in this instance oriented, that is to say that the angle δ of the transverse grooves of half of the intermediate part 4 is opposite in sign to the angle δ of the transverse grooves of the other half of the same intermediate part 4.

Each block 6 comprises lateral faces and a contact face 60, the latter being the only face visible in FIG. 1. All of the contact faces of the relief elements of the tread together form the tread surface 10 of the tread 1 that is intended to come into contact with the road surface during running.

The contact face 60 of each block 6 of all the rows of the tread, with the exception of the rows in the edge parts, is divided into two parts with equal surface areas by an incision that opens onto this face. The mean line 70 of the incision on the contact face follows a mean profile which is substantially parallel to the leading and trailing edge corners; this line 70 therefore makes an angle of 11 degrees equal to the angle δ with the axial direction YY'.

For preference, the direction of the line of the incision on the contact face of a block is parallel to the bisector of the angle formed by the mean directions of the transverse grooves that delimit this block.

FIG. 4, which shows a partial view of two blocks 6 of a row in the intermediate part, shows that the leading 61 and trailing 62 faces are inclined respectively by an angle αA equal to 10 degrees and angle αF equal to 2 degrees with respect to planes perpendicular to the contact face passing through the leading and trailing edge corners respectively. The angles αA and αF are such that the faces that delimit one and the same transverse groove 3 both converge towards a central position in the direction toward the depth of the tread.

Each block 6 of the rows of the intermediate part 4 is provided with a single incision 7 which is inclined in the depth by a mean angle β with respect to a plane perpendicular to the contact face and passing through the mean line 70 of the incision on the contact face 60; this incision 7 is oriented in such a way that the points of the incision furthest towards the inside of the tread have a tendency to diverge increasingly from points of the trailing face so as to delimit, with the leading face 61, a block volume which is smaller than the volume that this same incision 7 delimits with the trailing face 62.

The incision 7 is planar overall and intersects the lateral faces of each block along a line T (the line of the incision corresponds to the intersection between the mean plane of the incision and the contact face of the block) that makes a mean angle β with a plane P3 perpendicular to the contact face and along the intersection of the incision with the contact face. This angle in this instance is equal to 6 degrees. This same incision is delimited by opposing walls of material approximately 0.4 mm apart.

The walls delimiting the incision 7 are provided with blocking means 71 which interact with one another in order to reduce or even cancel any relative movement of one wall with respect to the other as they come into contact with the road surface during running; what is meant here by relative movement is that the blocking means are effective in blocking any movement of one wall in relation to the other in two different directions, namely in the direction of the thickness of the tread and in the direction perpendicular to the direction along the thickness, this perpendicular direction being contained within the mean plane of the incision.

The incision centered on the contact face of a block is such that, combined with the inclination of the leading face, it delimits a volume VA which is smaller than the volume VF delimited by the same incision and the trailing face. In this instance, these volumes are measured between the contact face (bounded by the curved surface S) and a curved surface S' parallel to the surface S and passing through the bottom of the incision.

In this variant, the incision 7 is also extended over its entire length by a part 72 which is greater in width than the mean width of the incision. In this instance, this widened part 72 opens at its ends onto the lateral faces of the block 6 and is of substantially oblong cross section with a mean width of mm and a mean length of 8 mm (this part is not included in the evaluation of the volumes VA and VF). The volume VA here is equal to 98% of the volume VF.

As depicted with this variant, the blocks of the edge parts 51, 52 of the tread are entirely free of incisions.

Figure 5:
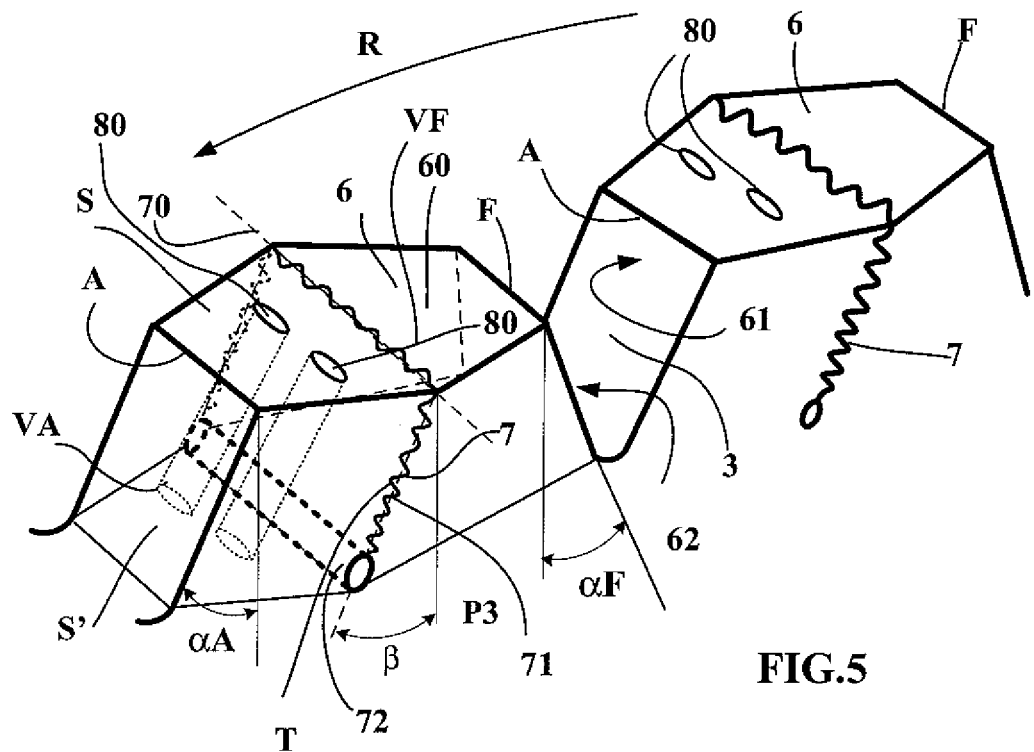
FIG. 5 shows a variant of tread further provided with blind longilinear cavities.
Figure 6:
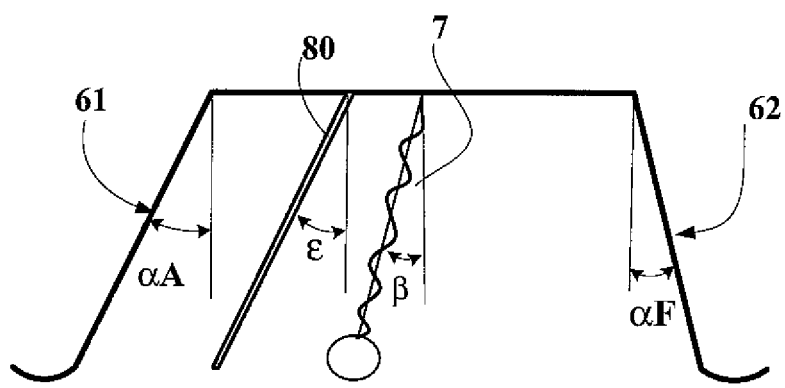
FIG. 6 shows a cross section through the tread shown in FIG. 5.

In another variant illustrated in the perspective view (FIG. 5) and the view in section on a plane perpendicular to the axis of rotation of the tire on which the tread is designed to be fitted (FIG. 6), two blind longilinear cavities 80 of elliptical cross section are added to the tread shown in FIG. 3 and to all the blocks comprising an inclined incision 7 according to the invention.

These blind longilinear cavities 80 are located on that part of the blocks that lie between the incision 7 and the leading face 61, two blind longilinear cavities 80 of elliptical cross section. These blind longilinear cavities 80 open only onto the contact face of the blocks and not onto the lateral faces of the blocks and have depths equal or close to the depth of the inclined incision 7 and are themselves inclined by a mean angle ϵ other than zero degrees with respect to a perpendicular to the tread surface, this angle ϵ being in the same direction as the angle αA of the leading face of the blocks, and in this instance equal to the angle αA that the said leading face makes. These additional cavities generate additional edge corners on the contact face without in any way appreciably affecting the compression and shear strengths of the blocks. Moreover, their inclination, which is chosen to be in the same direction as that of the leading face and as that of the incision, is also favorable in terms of wear.

Of course the invention is not restricted to the examples described and depicted and various modifications can be made thereto without departing from its scope.

The invention claimed is:

1. A tire tread comprising at least two grooves of circumferential overall orientation and a plurality of grooves of transverse overall orientation delimiting at least one intermediate row of blocks and edge rows transversely delimiting the tread;
    each block of the at least one intermediate row comprising lateral faces, a contact face intersecting the lateral faces to form edge corners, the edge corner that is first to come into contact with the road surface during running corresponding to the leading edge corner formed by the intersection of the contact face with a lateral face known as the leading face of the block, the edge corner last to leave contact being known as the trailing edge corner formed by the intersection of the contact face and of a lateral face known as the trailing face;
    on the blocks of the at least one intermediate row, the leading face making, with a perpendicular to the contact face and passing through the leading edge corner, a mean angle αA which is greater than zero degrees, the trailing face making, with a perpendicular to the contact face and passing through the trailing edge corner, a mean angle αF which is greater than zero degrees, the angle αA of the leading face being greater than the angle αF of the trailing face, the leading and trailing faces of one and the same block being oriented in such a way as to diverge from one another from the running surface toward the interior of the tread;
    each block of at least one intermediate row comprises an incision extending into the thickness of the block over at least a depth equal to the depth of the transverse grooves that delimit the said block, this incision being delimited by opposing faces provided with blocking means for blocking the relative movements of one of the said faces with respect to the other face in at least one direction, this incision dividing the contact face of the block into two parts with substantially equal surface areas;
    wherein the incision is inclined by a mean angle β, measured with respect to the perpendicular to the contact face in the same direction as the angle αA of the leading face;
    wherein the volume of material contained between the leading face and the incision is less than the volume of material contained between the trailing face and the same incision; and
    wherein over a plurality of blocks, at least a part situated between the incision and the leading edge or between the incision and the trailing edge of each of the said blocks is provided with at least one blind longilinear cavity, each blind longilinear cavity being inclined by a mean angle ϵ other than zero degrees with respect to a perpendicular to the tread surface, this angle ϵ being in the same direction as the angle αA of the leading face of the said blocks and at most equal to the angle αA of the said leading face.

2. The tire tread according to claim 1, wherein the difference between the volume of material contained between the leading face and the incision and the volume of material contained between the trailing face and the same incision is at least equal to 1% of the larger volume.

3. The tire tread according to claim 1, wherein the difference between the volume of material contained between the leading face and the incision and the volume of material contained between the trailing face and same incision is at most equal to 15% of the larger volume.

4. The tire tread according to claim 1, wherein the incisions are provided with blocking means for blocking in the transverse direction and in the direction of the thickness of the tread.

5. The tire tread according to claim 1, wherein the incision is extended over its entire length by a part which is of a width greater than the mean width of the incision, this widened part opening at its ends onto lateral faces of the block.

6. The tire tread according to claim 1, wherein the direction of the line of the incision on the contact face of a block is parallel to the bisector of the angle formed by the directions of the transverse grooves that delimit the said block.

7. The tire tread according to claim 1, wherein the tread pattern elements at the edges of the tread have no incisions.

8. A tire provided with a tread defined according claim 1, wherein this tire comprises a visible means for indicating the preferred direction of rotation.

9. The tire tread according to claim 1, wherein each blind longilinear cavity has a depth equal or close to the depth of the inclined incision.

10. The tire tread according to claim 9, wherein each blind longilinear cavity has an elliptical cross section.

* * * * *